(12) United States Patent
Rune et al.

(10) Patent No.: US 10,602,442 B2
(45) Date of Patent: Mar. 24, 2020

(54) METHOD FOR MANAGING A USER EQUIPMENT DEVICE

(71) Applicant: Telefonaktiebolaget L M Ericsson (publ), Stockholm (SE)

(72) Inventors: Johan Rune, Lidingö (SE); Anders E. Eriksson, Kista (SE); Erik Eriksson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/899,494

(22) PCT Filed: Jun. 28, 2013

(86) PCT No.: PCT/SE2013/050831
§ 371 (c)(1),
(2) Date: Dec. 17, 2015

(87) PCT Pub. No.: WO2014/209195
PCT Pub. Date: Dec. 31, 2014

(65) Prior Publication Data
US 2016/0142975 A1 May 19, 2016

(51) Int. Cl.
*H04W 52/02* (2009.01)
*H04W 4/70* (2018.01)
*H04W 76/30* (2018.01)

(52) U.S. Cl.
CPC ......... *H04W 52/0212* (2013.01); *H04W 4/70* (2018.02); *H04W 52/0209* (2013.01);
(Continued)

(58) Field of Classification Search
CPC .................................................. H04W 52/0209
See application file for complete search history.

(56) References Cited

U.S. PATENT DOCUMENTS

2007/0036296 A1* 2/2007 Flanagan ............ H04L 63/0428
379/88.19

FOREIGN PATENT DOCUMENTS

EP 2385734 A1 9/2011
EP 2 579 671 A2 4/2013
(Continued)

OTHER PUBLICATIONS

International Search Report for International application No. PCT/SE2013/050831 dated Mar. 27, 2014.
(Continued)

*Primary Examiner* — Hsinchun Liao
(74) *Attorney, Agent, or Firm* — Baker Botts, LLP

(57) ABSTRACT

A method, in a network node, for managing a user equipment device is disclosed. The method comprises the steps of receiving at least one of an apply instruction or a withhold instruction concerning an energy saving process for the user equipment device (step 100), applying the energy saving process for the user equipment device if the instruction is an apply instruction (step 130) and withholding application of the energy saving process for the user equipment device if the instruction is a withhold instruction (step 120). The energy saving process comprises retaining a context for the user equipment device after conducting a network detach procedure with the user equipment device (step 236*b*). Also disclosed are a method in a user equipment device, a computer program product for carrying out such methods, a network node and a user equipment device.

15 Claims, 10 Drawing Sheets

(52) U.S. Cl.
CPC ............. *H04W 76/30* (2018.02); *Y02D 70/00* (2018.01); *Y02D 70/1224* (2018.01); *Y02D 70/1242* (2018.01); *Y02D 70/1262* (2018.01); *Y02D 70/21* (2018.01); *Y02D 70/24* (2018.01)

(56) References Cited

FOREIGN PATENT DOCUMENTS

| | | |
|---|---|---|
| EP | 2579671 | 4/2013 |
| GB | 2 497 073 A | 6/2013 |
| RU | 2010136740 | 3/2012 |
| WO | 2009097602 | 8/2009 |
| WO | 2013/050002 | 4/2013 |

OTHER PUBLICATIONS

3GPP TR 23.887 v12.0.0; Technical Report; 3rd Generation Partnership Project; Technical Specification Group Services and System Aspects; Study on Machine-Type Communications (MTC) and other mobile data applications communications enhancements (Release 12) Dec. 2013.

3GPP TR 23.887 v0.10.0; Technical Report; 3rd Generation Partnership Project; Technical Specification Group Services and System Aspects; Machine-Type and other Mobile Data Applications Communications Enhancements (Release 12) Jun. 2013.

3GPP TS 32.401 v11.0.0; Technical Specification; 3rd Generation Partnership Project; Technical Specification Group Services and System Aspects; Telecommunication management; Performance Management (PM); Concept and requirements (Release 11) Sep. 2012.

3GPP TS 36.331 v11.1.0; Technical Specification; 3rd Generation Partnership Project; Technical Specification Group Radio Access Network; Evolved Universal Terrestrial Radio Access (E-UTRA); Radio Resource Control (RRC); Protocol specification (Release 11) Sep. 2012.

Russian Patent Office, Office Action and Search Report, Application No. 2016102617/7(003783), PCT Application No. SE2013/050831, Date filed: Jun. 28, 2013, Date of actual completion of search: May 15, 2017, 7 pages.

\* cited by examiner

METHOD FOR MANAGING A USER EQUIPMENT DEVICE

PRIORITY

This nonprovisional application is a U.S. National Stage Filing under 35 U.S.C. § 371 of International Patent Application Serial No. PCT/SE2013/050831, filed Jun. 28, 2013, and entitled "Method For Managing A User Equipment Device."

TECHNICAL FIELD

The present invention relates to a network node and to a method, in a network node, for managing a user equipment device. The present invention also relates to a user equipment device and to a method in a user equipment device.

BACKGROUND

Cellular communications networks are increasingly being used to support machine to machine (M2M) communication, in which a machine device (MD) communicates with an application server, allowing the server to receive information from the device and to configure the device. Cellular networks may enable such communication between device and application server, regardless of whether or not the server is comprised within the cellular network. It is envisaged that future development of cellular communications networks will include large numbers of such autonomous machine devices, often very small and associated with equipment or apparatus as opposed to a human user. Such devices will typically access the cellular network more or less infrequently, transmitting and receiving very small amounts of data, or being polled for data. In the Third Generation Partnership Project (3GPP) standardisation, machine to machine communication is referred to as Machine Type Communication (MTC), and machine devices are referred to as MTC devices, this being a subset within the larger category of User Equipment devices (UEs). For the purposes of clarity, the following text adopts the 3GPP terminology.

Supporting MTC over a cellular network involves changes to the network architecture, accommodating differences between MTC and user interaction with the network. FIG. 1 shows a reference network architecture 2 used to allow MTC devices to connect to a 3GPP network (UTRAN, E-UTRAN etc). FIG. 1 is reproduced from 3GPP TS 23.682 V11.3.0, "3rd Generation Partnership Project; Technical Specification Group Services and System Aspects; Architecture enhancements to facilitate communications with packet data networks and applications (Release 11)", December 2012. Additional shading of elements relating to MTC devices has been introduced to the Figure. Referring to FIG. 1, the UE, in this case an MTC device, can be seen to include an MTC UE application 6. The MTC device communicates over the radio access network (RAN) to access application servers via the core network of its home public land mobile network (HPLMN). Within the HPLMN various network entities may be introduced according to the particular model envisaged for MTC traffic. FIG. 1 illustrates a direct model, in which an application server (AS) 8 connects directly to a 3GPP operator network to perform direct communications with the MTC device. FIG. 1 also illustrates an indirect model, in which an application server (AS) 10 connects indirectly to an operator network via a Services Capability Server (SCS) 12. An MTC Inter Working Function (MTC-IWF) 14, acts as an interface enabling interworking of the 3GPP core network and the MTC service capability. A hybrid model may use both direct and indirect models simultaneously. The network architecture may also include an MTC Authentication, Authorisation and Accounting (AAA) function 16 within the HPLMN.

The nature of MTC devices and their envisaged use patterns mean that these devices are often required to be highly energy efficient. External power sources for MTC devices will often not be available, meaning the device must operate using energy harvesting or battery power, with frequent replacing or recharging of batteries being neither practical nor economically feasible. Efforts to increase the energy efficiency of MTC devices have generally focused on increasing the efficiency of operation of such devices within cellular networks such as Evolved Packet System (EPS) networks.

Many such methods seek to enable and enhance the possibility for MTC devices to spend time in energy efficient low power modes between communication events. One way of achieving this is to extend the maximum possible DRX cycle length in both idle and connected modes for EPS/LTE (Evolved Packet System/Long Term Evolution) networks. Another possibility is to allow the MTC device to detach from the network after each communication event, and reattach when a need arises, for example when the device has uplink data to send or when it wants to poll a server for data or at predefined intervals agreed with the network. This "detach-reattach" method allows the MTC device to enter the "deepest sleep", or most low power state, with a large amount of the electrical circuitry in the device turned off. This deep sleep offers considerable advantages in energy saving. However, the network attach procedure is associated with a significant signalling overhead, and the need to perform such a procedure before each communication event reduces the overall energy efficiency of the detach-reattach method, owing both to the signalling overhead itself and to the time spent in non sleep modes while the attach or detach procedures are carried out.

SUMMARY

It is an aim of the present invention to provide methods and apparatus which obviate or reduce at least one or more of the disadvantages mentioned above.

According to the present invention, there is provided a method in a network node for managing a user equipment device. The method comprises receiving at least one of an apply instruction or a withhold instruction concerning an energy saving process for the user equipment device, applying the energy saving process for the user equipment device if the instruction is an apply instruction, and withholding application of the energy saving process for the user equipment device if the instruction is a withhold instruction. The energy saving process of the method comprises retaining a context for the user equipment device after conducting a network detach procedure with the user equipment device.

Aspects of the present invention thus enable the targeted application of an energy saving procedure for a user equipment device, according to an instruction received concerning the application or otherwise of the energy saving process for that particular user equipment device. The energy saving process involves the retention of a context for the user equipment device following network detach, thus reducing the signalling load and time required for a potential subsequent network attach procedure, and so reducing the energy required to reattach the user equipment device to the network.

According to some embodiments, the apply instruction and/or withhold instruction may be received from the user equipment device or may be received from another source. For example, the apply instruction and/or withhold instruction may be contained within subscriber data received from another network entity. In some examples, the apply instruction and withhold instruction may take the form of the presence or absence of a flag relating to the energy saving process.

According to some embodiments, the network may be an Evolved Packet System (EPS)/Long Term Evolution (LTE) network, and the network node may comprise a Mobility Management Entity (MME).

According to some embodiments, the energy saving process may further comprise retaining, after conducting a network detach procedure with the user equipment device, at least some network resources reserved for the user equipment device. Such retention of network resources may further reduce the signalling load and time required for a potential subsequent network reattach procedure. In some examples, the retained network resources may comprise bearers and may, in an EPS/LTE network, comprise serving gateway (SGW) and packet data network gateway (PGW) bearers. The network resources may be retained for as long as the user equipment device context is retained.

According to some embodiments, the network resources may be associated with network nodes at least partially serving machine type communication devices. In some examples, network nodes at least partially serving machine type communication devices may comprise an MTC-IWF, and/or an SCS.

In some examples, retention of network resources may comprise not releasing network resources during or following a network detach procedure. In other examples, retaining network resources may comprise explicitly instructing another network entity to retain the resources, for example for a specific period of time or until receipt of a further instruction indicating that the resources may be released.

According to some embodiments, the method may further comprise receiving configuration data for the energy saving process, and applying the configuration data when applying the energy saving process. Such configuration data may afford additional flexibility, enabling the energy saving process to be tailored for a particular user equipment device or category of user equipment device.

According to some embodiments, the configuration data may comprise a time period over which the user equipment device context is to be retained. Configuring the energy saving process such that the context is retained for a specified time period may enable the network node to retain the context only as long as is appropriate for the particular user equipment device. In this manner, wastage of resources through retaining a context longer than necessary may be avoided. In addition, energy saving advantages associated with retaining a context may be afforded for devices which may have an unusually long time period between a network detach and subsequent network reattach.

According to some embodiments, the configuration data may comprise an indication concerning retention of network resources for the user equipment device following detach of the user equipment device. The indication may in some examples be a recommendation on retention of network resources, which recommendation may be followed by the network node but compliance with which is not required. In other examples, the indication may be an instruction which the network node is obliged to comply with. In this manner, possible additional steps comprised within the energy saving process may be configured for a particular user equipment device, thus enabling tailoring of the energy saving process to a particular user equipment device or category of user equipment devices.

According to some embodiments, the configuration data may comprise an indication of whether explicit or implicit detach procedures should be used for the user equipment device. According to further embodiments, the configuration data may comprise an indicated time limit for implicit detach procedure initiation. The indicated time limit may be a recommended time limit which the network node may voluntarily comply with, or may be an instructed time limit which the network node is required to apply.

According to some embodiments, the configuration data may be comprised in at least one of: a message received from a user equipment device during a network attach session, user equipment attach signalling, user equipment detach signalling, user equipment capability and/or category signalling, or a message containing user subscriber data received from another network entity.

According to some embodiments, the instruction may be comprised in at least one of: a message received from a user equipment device during a network attach session, user equipment attach signalling, user equipment detach signalling, user equipment capability and/or category signalling, or a message containing user subscriber data received from another network entity.

The another network entity may for example be a subscriber database or subscription database such as for example a Home Subscriber Server in an EPS/LTE network.

According to examples of the invention, an apply or withhold instruction and optional configuration data may be received in the same or in different manners. For example configuration data may be contained in user subscription information with the instruction received directly from the user equipment device in attach signalling, detach signalling or in a message received during an attach session. In other examples both instruction and configuration data may be received in the same message, sent as part of attach, detach or other signalling. User equipment device originating messages may for example comprise Non-Access Stratum (NAS) messages in an EPS/LTE network.

According to another aspect of the present invention, there is provided a method in a user equipment device in a network. The method comprises sending at least one of an apply instruction or a withhold instruction to a network node concerning an energy saving process for the user equipment device. The energy saving process of the method comprises retaining a context for the user equipment device after conducting a network detach procedure with the user equipment device.

In sending at least one of an apply instruction or a withhold instruction concerning an energy saving process for the user equipment device, aspects of the present invention enable a user equipment device to control whether or not the energy saving process is applied to it, thus enabling a user equipment device to tailor the application or otherwise of the energy saving process to its requirements, which requirements may evolve over time.

According to some embodiments, the method may further comprise sending configuration data concerning the energy saving process to the network node. In some examples, such configuration data may be included with the instruction. In other examples, the configuration data may be sent separately from the instruction.

According to some embodiments, sending configuration data may comprise sending at least one of a network attach session message, attach signalling, detach signalling, or user equipment capability and/or category signalling.

According to some embodiments, sending at least one of an apply or a withhold instruction may comprise sending at least one of a network attach session message, attach signalling, detach signalling, or user equipment capability and/or category signalling. Messages sent by the user equipment device may for example comprise Non-Access Stratum (NAS) messages in an EPS/LTE network.

According to some examples, the method may further comprise, if the instruction is an apply instruction, retaining a UE identifier for the user equipment device after conducting a network detach procedure with the network node. The UE identifier may contain a network node identifier. In some examples, the identifier may be discarded at the end of a time period for retention of the user equipment device context in the network node. This time period may in some examples be standardised and may be programmed into both the user equipment device and the network node. In other examples, the time period may be specific to the user equipment device or category, and may be sent to the network node by the user equipment device or included in user equipment device subscriber data. In an EPS/LTE network the UE identifier may for example comprise a Globally Unique Temporary ID (GUTI) which contains a Globally Unique MME Identifier (GUMMEI).

According to some examples, the method may further comprise, if the instruction is an apply instruction, retaining, after conducting a network detach procedure with the network node, a bearer identity for each bearer associated with the user equipment device for which a context has been retained in the network node or other network entities.

According to another aspect of the present invention, there is provided a computer program product, configured when run on a computer to conduct a method according to either of the first or second aspects of the present invention.

According to another aspect of the present invention, there is provided a network node comprising a receiving unit configured to receive an instruction concerning an energy saving process for a user equipment device, and an energy saving process unit configured to apply the energy saving process for the user equipment device in accordance with the received instruction. The energy saving process comprises retaining a context for the user equipment device after conducting a network detach procedure with the user equipment device.

According to another aspect of the present invention, there is provided a user equipment device for use in a network, comprising an energy saving instruction unit, configured to instruct a network node concerning an energy saving process for the user equipment device. The energy saving process comprises retaining a context for the user equipment device in the network node after conducting a network detach procedure with the user equipment device.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The present invention provides methods, a computer program product and apparatus enabling the selective application by a network node of an energy saving process for a user equipment device (UE), according to an instruction received at the network node. The energy saving process comprises retaining a context for the UE after conducting a network detach procedure with the UE. The energy saving process is applied or not for the UE according to an apply instruction or withhold instruction for the UE received at the network node. The energy saving process may in some embodiments further comprise retaining, after conducting a network detach procedure with the user equipment device, at least some network resources reserved for the user equipment device, which resources may for example include bearer contexts.

Aspects of the invention are described below within the context of an EPS/LTE cellular network. However, it will be appreciated that the invention is equally applicable to Universal Mobile Telecommunications System (UMTS), Wideband Code Division Multiple Access (WCDMA), High Speed Packet Access (HSPA) and other cellular network systems.

In order to provide additional context for the present disclosure, a brief discussion of the signalling procedure for network attach and detach processes is given below, with reference to FIGS. 2A, 2B, 3 and 4.

Figure 1:
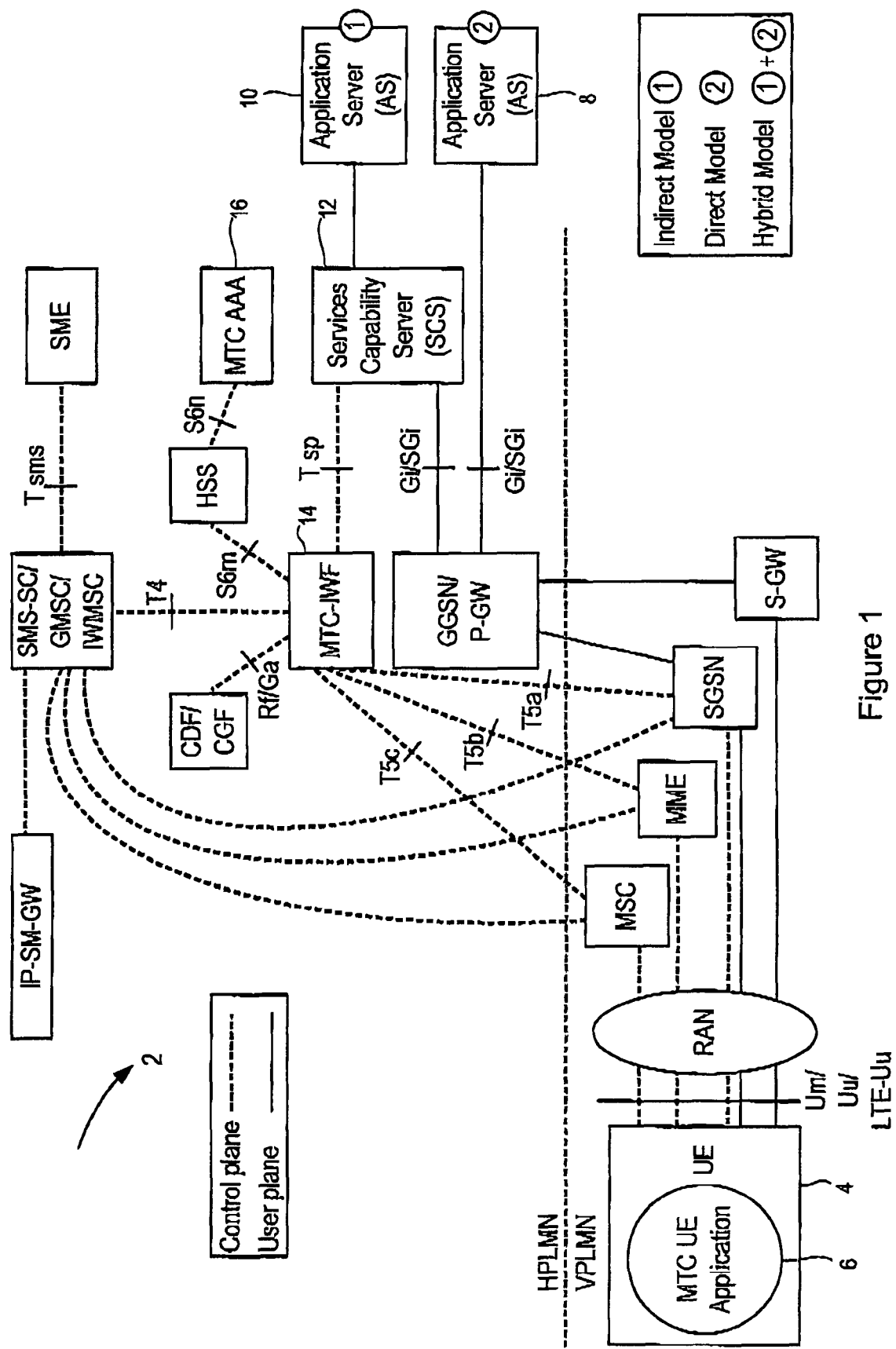
FIG. 1 illustrates a network architecture diagram in an EPS/LTE network accommodating MTC communication.
Figure 2A:
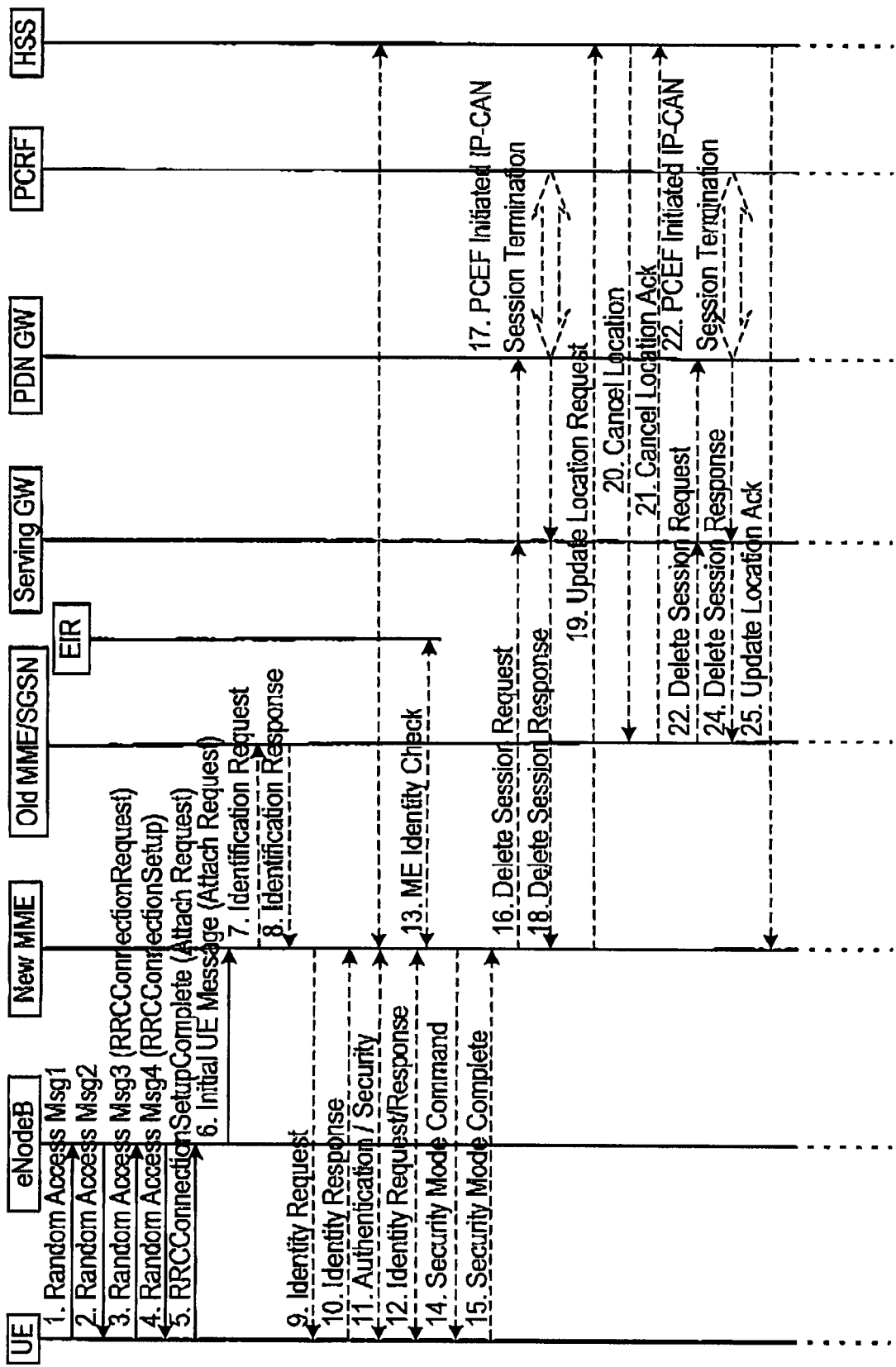
FIGS. 2a and 2b illustrate message sequencing in a network attach procedure.
Figure 2B:
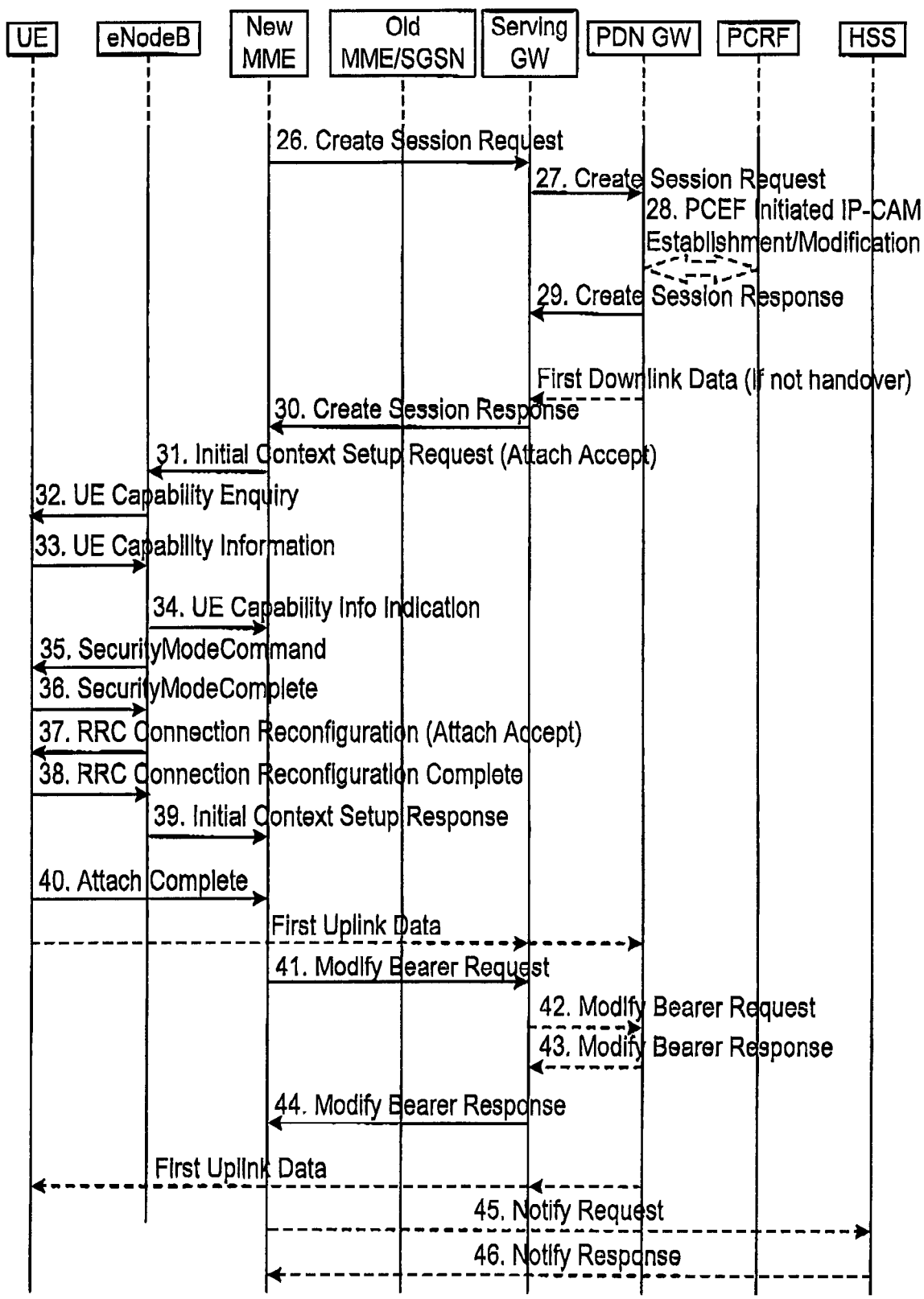

FIGS. 2A and 2B illustrate the message sequence for a network attach procedure in LTE. The attach procedure comprises the following stages:

Random Access Procedure, in which the UE accesses the eNodeB (messages 1-4 in FIG. 2A);

Radio Resource Control Connection Establishment, in which the UE and eNodeB interact to establish a Signalling Radio Bearer (SRB) (the piggybacked RRC messages in messages 3 and 4 in FIG. 2A);

Attach and Authentication, in which the UE registers with the Core Network and session contexts are established at the Mobility Management Entity (MME), the Serving Gateway (SGW) and the Packet Data Network Gateway (PDN GW) (messages 5 to 30, 37 and 40 in FIG. 2A and FIG. 2B); and Default Radio Bearer Setup, in which the default bearer for data transfer is established. The default bearer session is established at the UE, eNodeB, MME, SGW and Packet Data Network Gateway (PGW) (messages 26 to 44 in FIG. 2B).

It will be appreciated that all Non-Access Stratum (NAS) messages indicated in FIGS. 2A and 2B as being sent directly between the UE and the MME are in fact piggybacked as follows:

Between the MME and eNodeB: in the S1AP Downlink NAS Transport and Uplink NAS Transport messages, and Between the eNodeB and the UE: in the RRC messages DLInformationTransfer and ULInformationTransfer.

Figure 3:
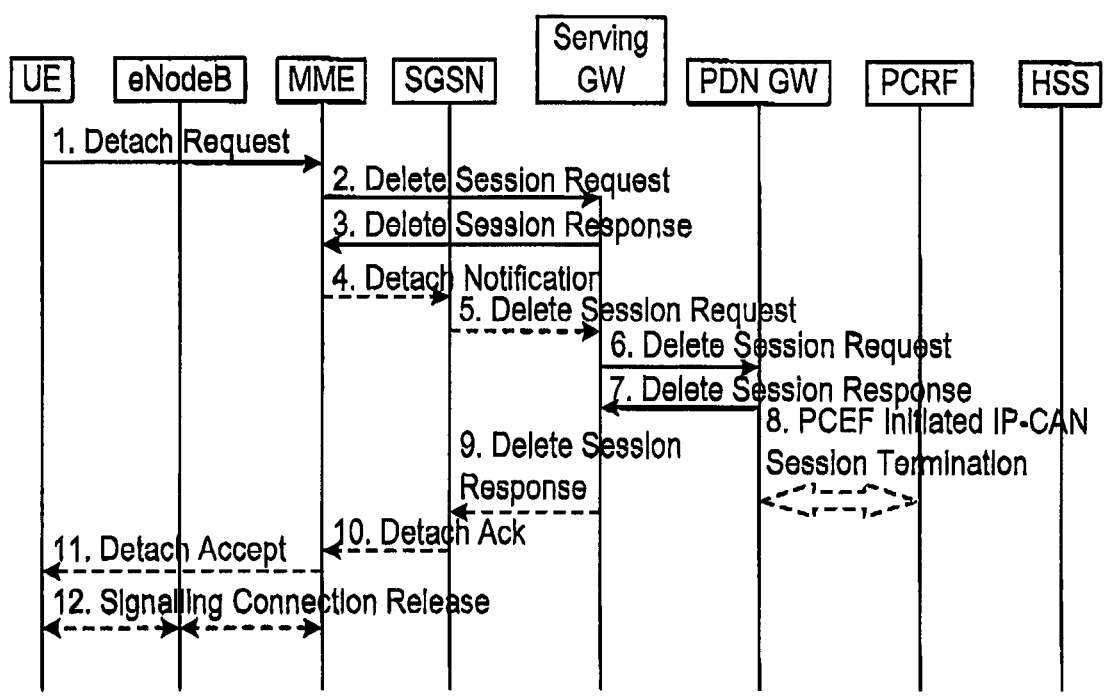
FIG. 3 illustrates message sequencing in a network detach procedure initiated by a UE.
Figure 4:
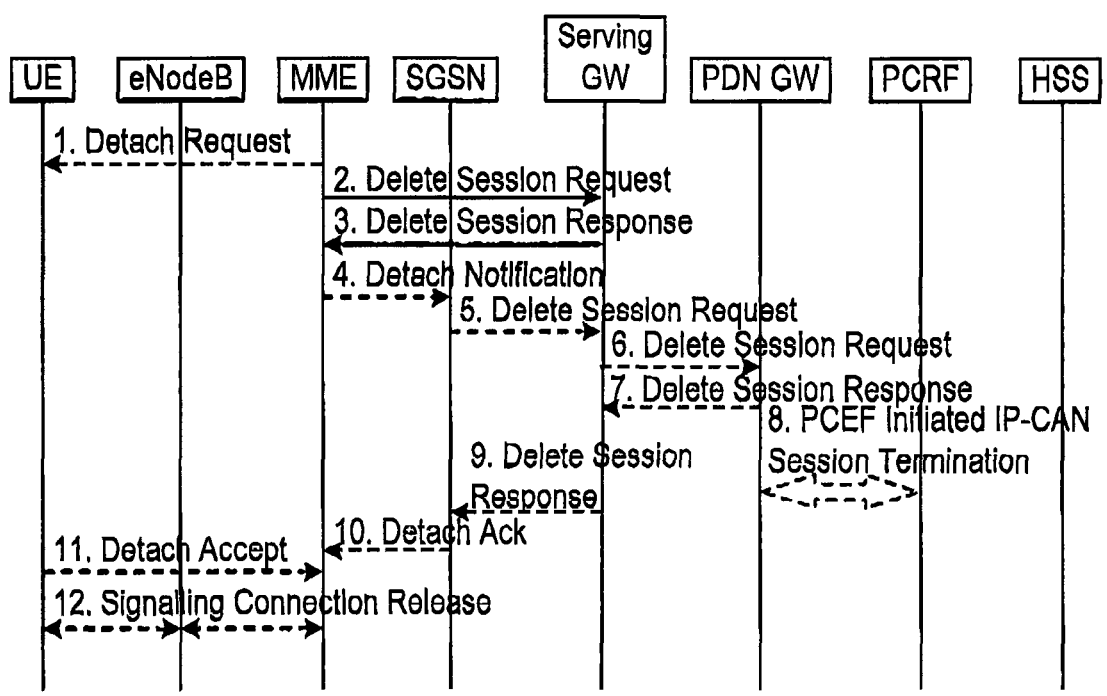
FIG. 4 illustrates message sequencing in a network detach procedure initiated by an MME.

Detach of a UE from the network may be initiated by the UE via a Detach Request (NAS) message, for example when the UE is switching off, or by the MME. FIG. 3 illustrates the message sequence for a UE initiated detach procedure in EPS/LTE, and FIG. 4 illustrates the message sequence for an MME initiated detach procedure. The MME initiated detach procedure illustrated in FIG. 4 may be implicit or explicit. An implicit detach procedure is triggered by a timeout, for example following absence of a Tracking Area Update Request NAS message or other contact from a UE for a predetermined period of time. During implicit detach procedures, messages 1, 11 and 12 illustrated in FIG. 4 are omitted.

It can be seen from FIGS. 2A and 2B that a large part of the signalling in the network attach procedure relates to the establishment of a context for the UE, and to some extent to the handling of remnants of previous contexts for the UE. The energy saving procedure of the present invention significantly reduces the signalling overhead of the attach procedure following a previous network detach, by retaining the UE context following network detach, so that the UE context is available for reuse, and a new UE context need not be established.

A UE context is a block of information associated with a UE attached to the network. The block of information contains the information required to maintain services towards the UE. This may for example include security information, UE capability information and connectivity information.

The possibility of retaining a UE context post detach is considered in 3GPP TS 23.401 V12.0.0, "3rd Generation Partnership Project; Technical Specification Group Services and System Aspects; General Packet Radio Service (GPRS) enhancements for Evolved Universal Terrestrial Radio Access Network (E-UTRAN) access (Release 12)", March 2013. This document indicates that an MME may keep for some time the MM context of a detached UE so that this data can be reused at a later attach. Whether or the MME retains contexts in this manner would be dependent upon a particular implementation. This approach, if applied, represents a blanket application of retention of UE context for all UEs, context retention forming part of the standard network detach procedure. The potential for context retention over longer time periods is therefore extremely limited. The time period for context retention is not specified in the standard and would be implementation dependent, but in order to be feasible for a blanket application to all UEs, it would need to be relatively short, targeting for example UEs subject to a detach and immediate reattach procedures. Such blanket application would be completely inappropriate for UEs having potentially very long time intervals between detach and subsequent reattach procedures. MTC devices for example, may connect to a network anywhere from once a minute to once a week or even less frequently. Consistently retaining contexts for all detached UEs over such extended time periods would be inefficient and would place an excessive burden on MME and network resources.

In contrast to the envisaged blanket retention of the 3GPP technical specification, the present invention applies a control mechanism in the form of an instruction received at the relevant network node, for example the MME, to apply or not apply the energy saving process of UE context retention. In this manner, context retention may be specifically targeted to those UEs for which it is appropriate, enabling context retention for much longer periods of time for certain UEs. These may include but are not limited to UEs in the form of MTC devices. Embodiments of the present invention provide further enhancements in the form of configuration of the energy saving process and possible additional energy saving steps. Configuration of the process may include instructing a time period over which the UE context should be retained. Additional steps may include retention of network resources reserved for the UE for example in the SGW and PGW, and where appropriate in MTC specific network entities such as an MTC-IWF and SCS. The configuration and additional steps may provide enhanced variation in how the energy saving process may be applied to individual UEs or categories of UEs. Details of the configuration and additional steps may be received at the network node in the form of configuration data, as discussed in further detail below.

Figure 5:
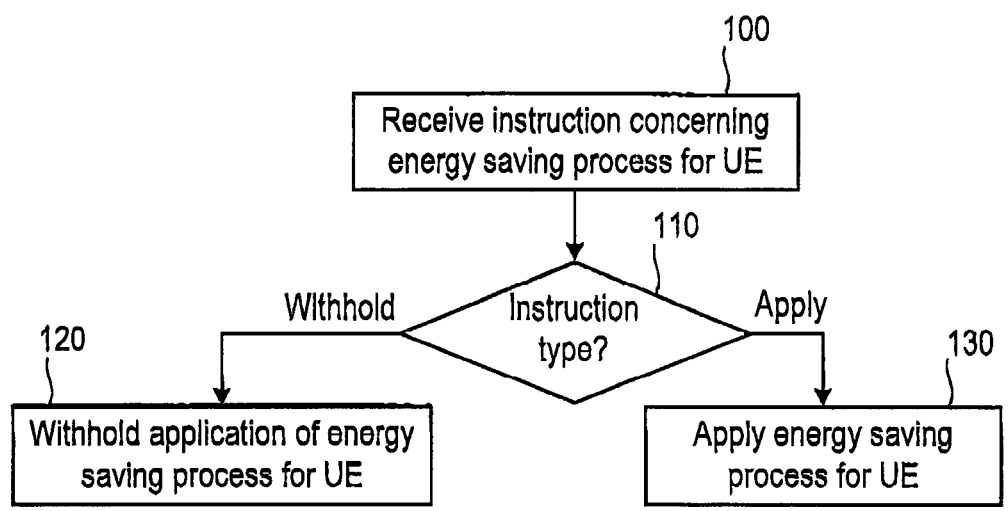
FIG. 5 is a flow chart illustrating steps in a method for managing a UE.

FIG. 5 is a flow chart illustrating process steps in a method according to an aspect of the present invention. The method is appropriate for conducting in a network node, and in the present illustrative example of an EPS/LTE network, is appropriate for conducting in the MME.

Referring to FIG. 5, in a first step 100, the MME receives an instruction concerning an energy saving process for a particular UE. The instruction may be received from the UE itself or from another network node such as for example the Home Subscriber Server (HSS). The sending of the instruction is discussed in further detail below. The instruction may take various different forms depending upon the method by which the instruction is conveyed to the MME. For example the instruction may be in the form of a flag specific to the energy saving process, setting of the flag instructing application of the process and non setting of the flag instructing withholding of the process. Other instruction forms may also be envisaged.

On receipt of the instruction, the MME assesses the type of instruction received at step 110. If the instruction is a withhold instruction, the MME withholds application of the energy saving process for the UE at step 120, performing a normal detach procedure at an appropriate time without applying any steps of the energy saving process. If the instruction received is an apply instruction, the MME applies the energy saving process for the UE at step 130. This may entail checking for configuration data and conducting various steps during and after detach of the UE. The steps involved in applying the energy saving process are discussed in further detail below with reference to FIGS. 9 and 10.

As discussed above, the energy saving process conducted at step 130 may be configured for application to suit individual UEs or classes of UEs, including for example specifying a time period for which the UE context for a particular UE should be retained. Configuration of the process may also include specifying additional steps to be included in the process. Details of the configuration, as well as information concerning any additional energy saving steps to be performed, may be received at the MME in the form of configuration data, allowing the MME to configure the energy saving process to the particular UE. This data may be received from the UE itself or from the HSS.

In some examples, the configuration data may comprise a time period over which the UE context is to be retained. This may comprise an explicit indication as to the length of time during which the context should be retained after detach, on expiry of which time period the context may be deleted. In other examples, a context retention time period may be preconfigured into both the MME and the UE. The time period may be included in the subscriber information for the UE, downloaded to the MME from the Home Subscriber Server (HSS) and preloaded onto the Universal Subscriber Identity Module (USIM) of the UE. The time period may alternatively be conveyed to the UE via the system information broadcast in the cell of the UE. In another alternative, a standardised value for the time period may be hardcoded into both the UE and the MME.

In further examples, the context retention time period may be condition based, its expiry being triggered by the first to occur of a series of conditions. Such conditions may for example include:
(i) receipt of an Identification Request (GTPv2-C) message from a new MME;
(ii) receipt of a Cancel Location (Diameter S6a/S6d Application) message from the HSS;
(iii) conducting of a purge operation;
(iv) expiry of an additional, extended time period, which time period may for example be longer than the longest possible detach period for a UE employing a detach-reattach power saving scheme (if such a maximum detach period exists).

According to various examples, the context retention time period may be configured such that occurrence of any one of the above events may trigger its expiry, and hence deletion of the retained UE context.

In further examples, the configuration data may comprise information as to whether explicit or implicit detach procedures are to be employed for the UE. If implicit detach is to be used, the configuration data may also include a recommended or required timeout value for the MME to use for triggering the implicit detach.

In still further examples, the configuration data may comprise an indication concerning retention of additional network resources reserved for the UE. The indication may be a recommendation as to whether the additional network resources should be a retained, leaving the option for the MME to comply or not with the recommendation. In other examples, the indication may be an instruction with which the MME is obliged to comply. The resources may include bearer contexts in the SGW and PGW and the MME or contexts/resources in other entities, for example including an MTC-IWF or SCS or other proxy server associated with the UE.

Configuration data received at the MME may comprise some, all or any combination of the above discussed types of information, as appropriate for the particular UE and network operator requirements. Configuration data may be chosen for a particular UE or class of UEs by a network operator according to operational priorities, or UEs may be programmed to select appropriate configuration data for their own operation according to their current functioning and network conditions.

Figure 6:
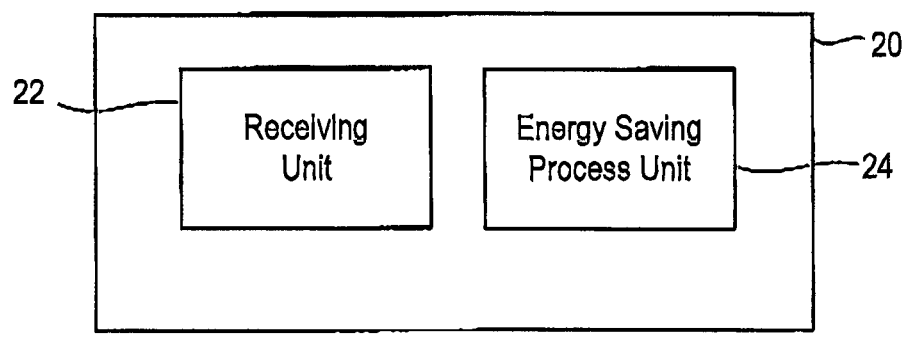
FIG. 6 is a functional block diagram illustrating a network node.

The steps of the above described method may be conducted in a network node, which may in some examples be an MME. FIG. 6 is a diagram illustrating functional units of a network node suitable for carrying out the above described method, for example in accordance with instructions received from a computer program stored on a computer readable medium. Referring to FIG. 6, the node 20 comprises a receiving unit 22, configured to receive an instruction concerning an energy saving process for a user equipment device, and an energy saving process unit 24, configured to apply the energy saving process for the user equipment device in accordance with the received instruction. It will be appreciated that the units of the illustrated network node are functional units, and may be realised in any appropriate combination of hardware and/or software. Additional functional units may also be present in the node.

As discussed above, the instruction concerning application or withholding of the energy saving process, as well as possible configuration data, provide control mechanisms allowing for the selective application of the energy saving process for a particular UE, and the possible configuration of that process. The instruction and possible configuration data may be conveyed to the MME in different ways, as discussed in detail below.

According to one embodiment, the instruction and/or configuration data may be conveyed to the MME from the UE during a network attach procedure. During this procedure the UE may indicate to the MME that the energy saving procedure should or should not be applied. This indication may be included in the Attach Request (NAS) message for example in the form of a new Information Element (IE) or as a new value of the EPS attach type IE. The indication may comprise only the instruction to apply or withhold the energy saving process, or the indication may also contain or be accompanied by configuration data as discussed above. In some embodiments, a withhold instruction may comprise an absence of any indication concerning the energy saving procedure. In such embodiments, a UE may be assumed not to support the energy saving process and thus not to anticipate its use.

According to another embodiment, and if an explicit detach procedure is used for the UE, the instruction and/or configuration data may be conveyed to the MME from the UE during a network detach procedure. The UE may indicate in the Detach Request (NAS) message that that the energy saving procedure should or should not be applied. As in the case of the network attach procedure discussed above, a withhold instruction may comprise an absence of any indication concerning the energy saving procedure. As in the above discussed attach signalling, the indication may comprise only the instruction to apply or withhold the energy saving process, or the indication may also contain or be accompanied by configuration data as discussed above. If included with detach signalling, the configuration data would not include an instruction as to the type of detach procedure to be used or a time limit for implicit detach, as the instruction may only be included in detach signalling if explicit detach is used. Where energy saving is paramount, the use of detach signalling may therefore be less desirable than other alternatives for conveying the instruction, which alternatives could allow a UE to use implicit detach, and so avoid the sending of the Detach Request (NAS) message and save the energy associated with sending this message.

According to another embodiment, the instruction and/or configuration data may be associated with a category or capability of the UE, and may therefore be included in any of the IEs in the Attach Request (NAS) message that indicate the various properties of the UE. This may include the UE network capability IE, the MS network capability IE, the Mobile station classmark 2 IE or the Device properties IE. In some embodiments, the instruction and optional configuration data may be implicitly associated with UE category, such as a Mobile Station classmark, or a packet of capabilities with a certain label, including for example 'low-energy device'. If several such categories or capability packets are defined, each of them may be associated with a different set of configuration parameters, specifying a particular maximum context retention time period, whether bearer contexts and/or other allocated resources should be retained, whether explicit or implicit detach should be used, suitable timeout for implicit detach, etc.

In further embodiments, the instruction and/or configuration data may be associated with radio capability related parameters and the UE-EUTRA-Capability IE may be extended with the instruction concerning application of the energy saving process and if appropriate with additional configuration data. In the current RRC specification 3GPP TS 36.331 V11.1.0, "3rd Generation Partnership Project; Technical Specification Group Radio Access Network; Evolved Universal Terrestrial Radio Access (E-UTRA); Radio Resource Control (RRC); Protocol specification (Release 11)", September 2012, the UE-EUTRA-Capability IE is included in the ue-CapabilityRAT-Container IE, which in turn is included in the ue-CapabilityRAT-ContainerList IE in the UECapabilityInformation message.

During the attach procedure, the eNodeB requests capability information from the UE by sending the RRC message UECapabilityEnquiry to the UE (message 32 in FIG. 2B). The UE responds to the enquiry with the UECapabilityInformation (RRC) message (message 33 in FIG. 2B), which includes the capability information described above. This message is then forwarded by the eNodeB to the MME. The eNodeB includes the UECapabilityInformation (RRC) message in a ue-RadioAccessCapabilityInfo IE, which is then included in a UERadioAccessCapabilityInformation message (which is specified as an RRC message). The UERadioAccessCapabilityInformation message is in turn included in a UE Radio Capability IE, which the eNodeB sends to the MME in the UE Capability Info Indication (S1AP) message (message 34 in FIG. 2B). The MME stores the UE capability information in its UE context and keeps it for as long as the UE remains attached to the network. According to aspects of the present invention, the UE context, including the capability information, is retained by the MME post detach as part of the energy saving process. The context including capability information is then available for future reattach or for transfer to a new MME in the case of MME relocation.

When a UE transits from idle to connected mode during an attach session, the MME transfers the UE capability information to the eNodeB in the UE Radio Capability IE in the Initial Context Setup Request (S1AP) message (message 31 in FIG. 2B). The UE Radio Capability IE is optional in the Initial Context Setup Request message and during the Attach procedure it is absent. This absence triggers the eNodeB to request the information from the UE and forward it to the MME, as described above. However, according to aspects of the present invention, when the energy saving process has been applied and a UE later reattaches to the network, the UE capability information will still be stored in the MME as part of the UE context, and the UE Radio Capability IE will not therefore be absent in the Initial Context Setup Request message during the Attach procedure. The eNodeB will not therefore be prompted to request the capability information from the UE.

According to another embodiment, the instruction and/or configuration information may be included with subscriber data associated with the UE. The instruction and/or configuration data are therefore stored as part of the subscriber data in the HSS and in the USIM of the UE. The instruction and/or configuration data is then downloaded from the HSS to the MME together with other subscriber data when the UE registers in the MME.

According to another embodiment, the instruction and/or configuration data may be included in another NAS message. This may for example be a Tracking Area Update Request (NAS) message or any other uplink NAS message, and may for example be a new NAS message specified for this purpose.

Different combinations of the above discussed embodiments may be employed for the delivery of the instruction and configuration data. In one example arrangement, the configuration data containing details of the process and any additional steps to be conducted may be stored in the user subscription information, while the instruction concerning application of the process is received directly from the user equipment device in attach signalling, detach signalling or in a message received during an attach session. If the instruction is sent during attach signalling it may be included in the Attach Request (NAS) message, for instance in the UE network capability IE, the MS network capability IE or as a new value of the EPS attach type IE. According to this arrangement all the information required to apply the process may be preconfigured and received at the MME from the HSS, with the UE only required to instruct the MME to apply or withhold the process.

In some instances, it may be that the UE changes its mind about the application or not of the energy saving process. This may occur for example as a result of events in the UE that are specific to its usage or to applications running on the UE. In such cases, the UE may override a previous instruction sent by the UE or received as a default instruction in UE subscriber data. For example, if the UE has already instructed application of the process in the Attach Request (NAS) message, it may override this with a withhold instruction sent in a Detach Request (NAS) message (when using explicit detach) or in another NAS message, including for example a Tracking Area Update Request (NAS) message or other uplink NAS message. Such an override message may also be sent in the case that instruction and configuration data are received from the HSS in the subscriber data but the UE decides to override this instruction for some reason. This "override" possibility may also be used to change some of the configuration data previously supplied to the MME including for example the time period for UE context retention or details of resources to be retained etc.

Figure 7:
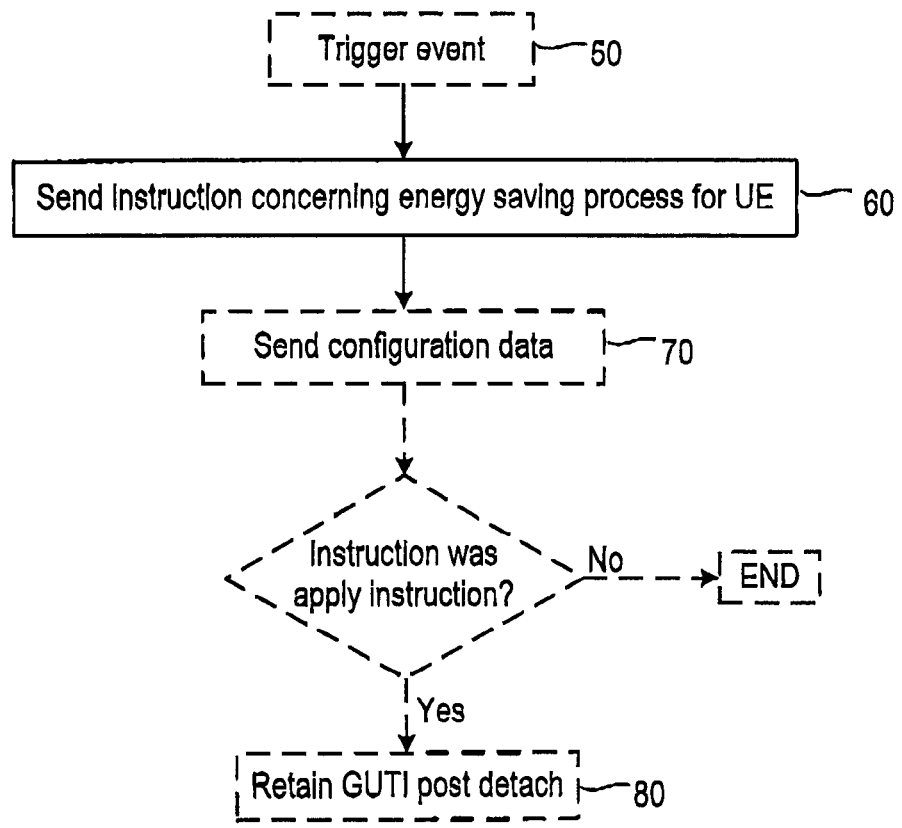
FIG. 7 is a flow chart illustrating steps in a method in a UE.

It will be appreciated that many of the above embodiments involve the MME receiving the instruction concerning application or withholding of the energy saving process from the UE. Another aspect of the present invention provides a method in a UE involving sending such an instruction to a network node. FIG. 7 illustrates steps in an example of such a method. According to the method of FIG. 7, on occurrence of a trigger at step 50, the UE sends an instruction concerning the energy saving process for the UE to the network node at step 60. The sending of the instruction by the UE may be preceded by different triggers, depending upon when and how the UE sends the instruction. For example in the case of an instruction sent as part of attach signalling, the sending may be triggered by the appropriate preceding step in the attach message sequence. Similarly, in the case of an instruction sent as part of detach signalling, the sending may be triggered by the appropriate preceding step in the detach message sequence or the event that triggered the detach, for example the expiry of a timer. In the case of an override instruction, the sending may be triggered by occurrence of an event changing the operating situation for the UE and so rendering the previously sent or default instruction obsolete.

The method of FIG. 7 may further comprise sending configuration data concerning the energy saving process to the network node in a step 70. As previously discussed, this configuration data may include a time period for UE context retention, recommendations for retention of network resources or recommendations concerning detach procedures. The instruction and configuration data may be sent using any of the signalling options discussed above, including but not limited to attach signalling, detach signalling, UE capability and or category signalling or uplink (NAS) messages.

The method of FIG. 7 may further comprise, if the instruction sent is an apply instruction, retaining a UE identifier, which may contain a network node identifier, after performing network detach in step 80. In the present example of an EPS/LTE network, this UE identifier may be a Globally Unique Temporary Identifier (GUTI) which includes a Globally Unique MME Identifier (GUMMEI) and an MME Temporary Mobile Subscriber Identifier (M-TMSI). The UE may then use this GUTI when reattaching to the network. As the GUTI contains the GUMMEI and is an identifier used by the MME, the GUTI will point to the correct MME and the correct UE context within the correct MME and will allow that MME to locate the retained UE context for use with the reattached UE. The UE may be configured to delete its GUTI after the maximum time period for retention of the UE context in the MME, as after this time the GUTI will not serve any useful purpose, the UE context in the MME having been deleted. Deleting the GUTI after this time period will also avoid any potential useless attempts to retrieve the deleted UE context from the old MME by a new MME in the event that the UE has moved to the coverage area of a new MME or MME pool.

If the instruction sent is an apply instruction, the method of FIG. 7 may also comprise retaining the EPS bearer identity of bearers for which contexts have been retained in the SGW, PGW and MME, if the energy saving process is configured such that these contexts are retained. The UE may retain the EPS bearer identity for each bearer retained in the relevant network nodes and may also retain other bearer related information including Quality of Service parameters. The EPS bearer identity and other bearer related information may be retained for as long as the GUTI is retained. Retention of this information allows matching of the bearer contexts in the SGW, PGW and MME so that for example no EPS bearer identity has to be changed in the bearer contexts in the network.

Figure 8:
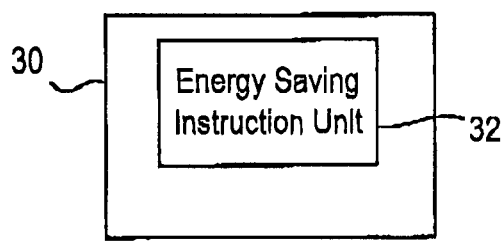
FIG. 8 is a functional block diagram of a UE.

FIG. 8 illustrates a functional unit of a UE 30 which may perform the above described method for example in accordance with instruction received from a computer program stored on a computer readable medium. The functional unit comprises an energy saving instruction unit 32, configured to instruct a network node concerning an energy saving process for the UE. It will be appreciated that the functional unit 32 may be realised in any appropriate combination of hardware and/or software. Additional functional units may also be present in the UE.

Figure 9:
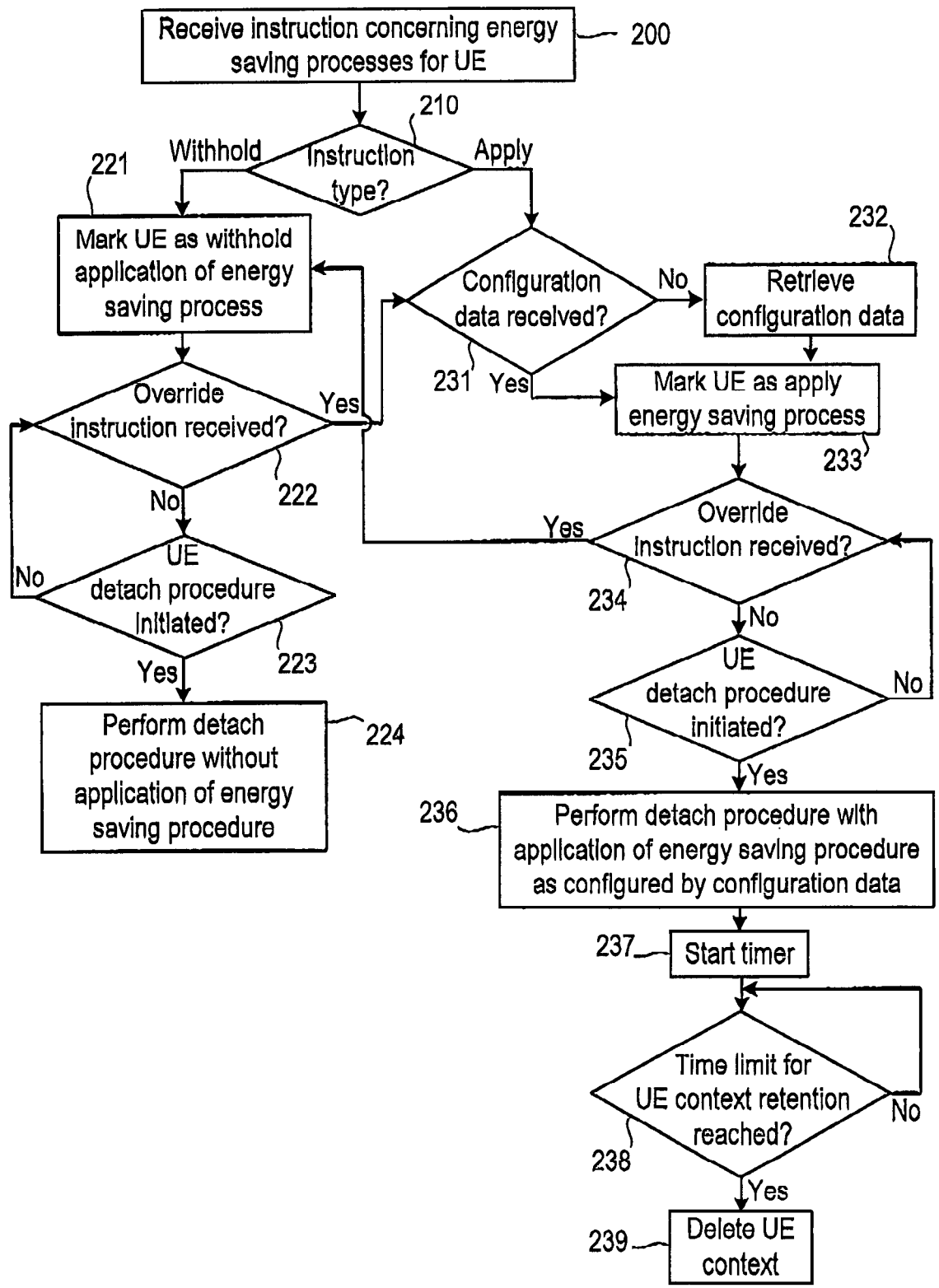
FIG. 9 is a flow chart illustrating steps in another example of a method for managing a UE.

FIG. 9 is a flow chart illustrating one example way in which a network node such as an MME may manage the receipt and application of instructions according to aspects of the present invention. The flow chart of FIG. 9 illustrates in further detail how the steps of FIG. 5 may be broken down to achieve the desired functionality.

With reference to FIG. 9, in a first step 200 the MME receives an instruction concerning an energy saving process for a UE. As discussed above, the instruction may be received from the UE or from another network entity such as the HSS. In step 210, the MME assesses the type of the instruction, i.e. whether the instruction is a withhold instruction or an apply instruction. If the instruction is a withhold instruction, the MME marks the UE at step 221 to indicate that the energy saving process should not be applied. The MME then proceeds to check, at step 222, whether or not an override instruction has been received, indicating that the energy saving process should be applied for the UE. If such an instruction has been received (Yes at step 222), the MME proceeds to step 231 as discussed below. If an override instruction has not been received (No at step 222), the MME proceeds to check, at step 223, whether or not detach procedure has been initiated (either by the MME itself or by the UE). If detach procedure has not been initiated (No at step 223), the MME continues to check for receipt of an override instruction at step 222. If detach has been initiated (Yes at step 223), the MME proceeds with the detach procedure without applying any steps of the energy saving process, i.e. without retention of the UE context or of any network resources reserved for the UE.

If the instruction received at step 200 is an apply instruction, the MME proceeds to step 231, in which the MME checks whether or not configuration data concerning the energy saving process for the UE has been received with the instruction at step 200. If such configuration data has been received (Yes at step 231), the MME proceeds to mark the UE to indicate that the energy saving procedure should be applied in step 233. If such configuration data has not been received with the instruction at step 200 (No at step 231), the MME proceeds to retrieve this data at step 232. This may for example involve retrieving configuration data including instructions about the correct detach procedure (explicit or implicit with suitable time limit). Retrieving configuration data in step 232 may involve retrieving preconfigured default configuration data from an internal memory in the MME or from subscriber data held in the HSS and conveyed to the MME. Following retrieval of configuration data at step 232 the MME proceeds to mark the UE as subject to application of the energy saving process in step 233. After marking the UE to indicate that the energy saving procedure should be applied in step 233, irrespective of whether the MME arrived at this step directly following the Yes branch from step 231 or indirectly following the No branch from step 231 via step 232, the MME then checks at step 234 whether or not an override instruction has been received, indicating that the energy saving procedure should not be applied for the UE. If such an instruction has been received (Yes at step 234), the MME proceeds to step 221 and follows the subsequent process as described above. If no override instruction has been received, the MME then checks at step 235 whether or not detach procedure with the UE has been initiated, either by the UE or by the MME. If detach procedure has not been initiated (No at step 235), the MME continues to check for receipt of an override instruction at step 234. If detach procedure has been initiated (Yes at step 235), the MME proceeds to step 236, performing the detach procedure with application of the energy saving process as configured by the configuration data, either received with the instruction in step 200 or retrieved in step 232. Details of what this may involve are discussed further below with reference to FIG. 10.

Following detach of the UE at step 236, the MME starts a timer at step 237 and checks for expiration of the time limit for UE context retention at step 238. The time limit may be preconfigured in the MME or may have been received or retrieved with the configuration data. The time limit may be an explicit limit or may be condition based, as discussed above. On expiration of the time limit (Yes at step 238), the MME proceeds to delete the UE context at step 239. If the UE attempts to reattach before expiry of the time limit, the stored UE context, as well as other network resources if retained, will be available to reduce the signalling required for the reattach procedure.

Figure 10:
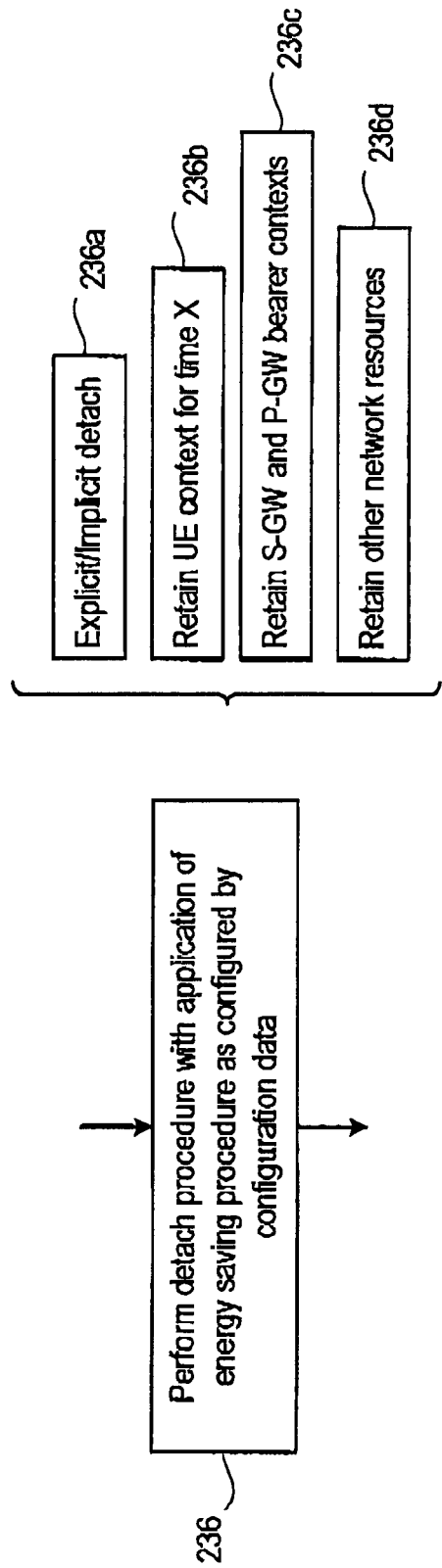
FIG. 10 is flow chart illustrating in more detail one of the steps of the method of FIG. 9.

FIG. 10 illustrates in further detail steps that may be comprised within the step 236 of performing the detach procedure with application of the energy saving process as configured by the configuration data. Depending upon the nature of the configuration data, step 236 may involve:

(i) Performing explicit or implicit detach procedures (step 236*a*). In the case of implicit detach, the time limit for initiating detach may be set in the configuration data.

(ii) Retaining the context of the UE for a specified period of time X (step 236*b*). As discussed above, this may be an explicitly stated time period or may be a time period defined by fulfilling a condition, such as receipt of a subsequent message or performing a purge function.

(iii) Retaining bearer contexts in the SGW and PGW (step 236*c*). Retaining bearer contexts may for example comprise not releasing those contexts at the usual point in the detach procedure. Referring to FIGS. 3 and 4, the MME may omit sending message 2, Delete Session Request (GTPv2-C). In other examples, the MME may explicitly request the SGW and PGW to retain the bearer contexts for a set period of time (which may be the same as the UE context retention time period) or until the MME sends a later message instructing release of the bearer contexts.

(iv) Retaining other network resources (step 236*d*). Other network resources may include information contexts and/or allocated software or hardware resources in network entities associated with the UE. In the case of MTC devices, such network entities may include the MTC-IWF, SCS or other proxy server associated with the MTC device.

Figure 11:
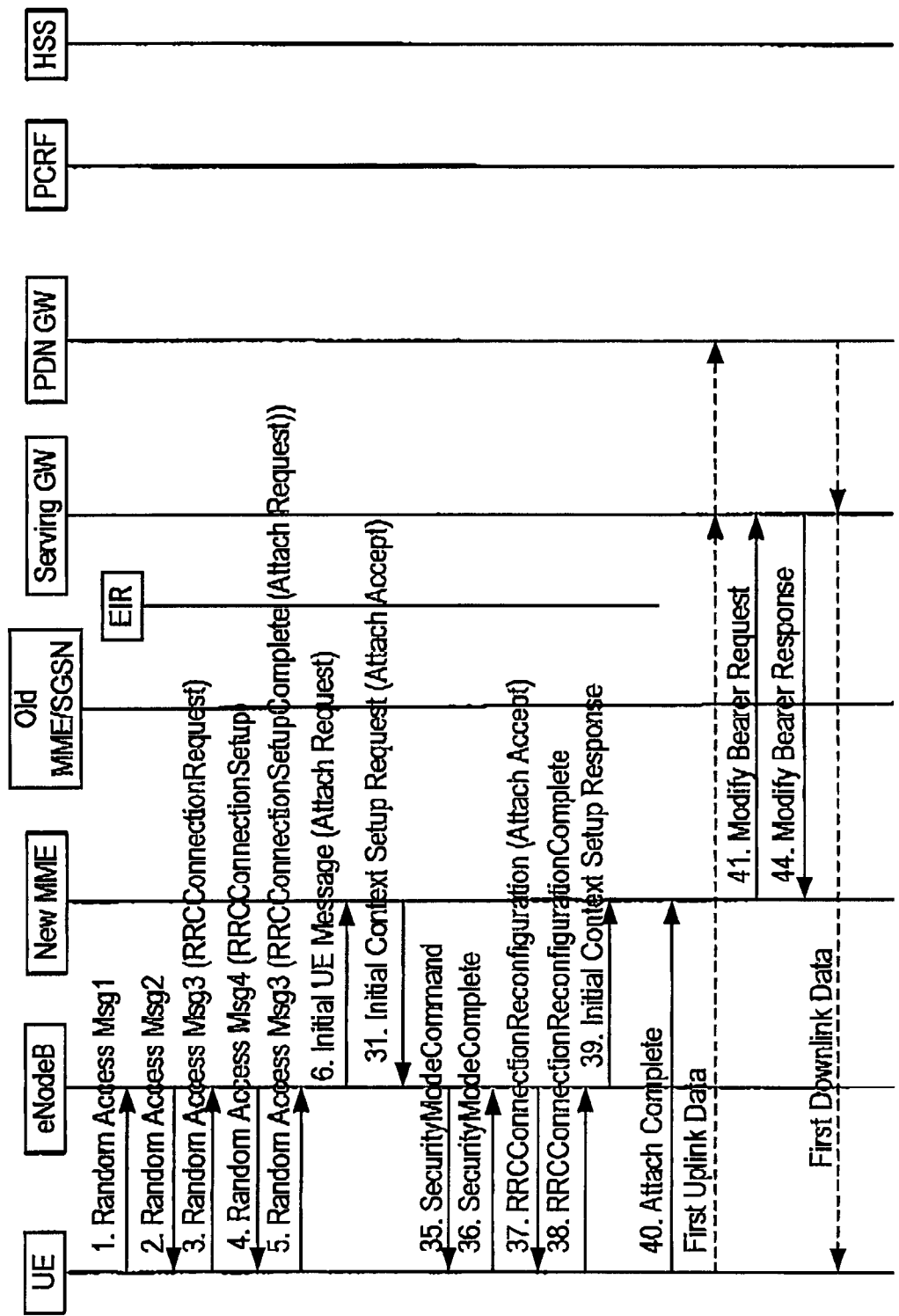
FIG. 11 illustrates message sequencing in a streamlined network attach procedure.

FIG. 11 illustrates the signalling flow in a streamlined attach procedure that may be followed on reattach of a UE whose context has been retained by the MME in accordance with aspects of the present invention. When compared with the standard procedure illustrated in FIGS. 2A and 2B it can be seen that a significant portion of the messages in the attach procedure have been eliminated, greatly reducing the signalling overhead of the procedure. By retaining the UE context in the MME, and if instructed also retaining bearer contexts in the SGW and PGW, message exchanges associated with the Attach and Authentication and Default Radio Bearer Setup stages of the standard attach process may be eliminated. Thus reduction in signalling reduces the energy associated with the process both through the reduction in number of messages to be transmitted and in the reduction in the amount of time during which the UE must be in a non sleep state.

By reducing the energy cost of an attach procedure, aspects of the present invention increase the efficiency of the detach-reattach method of energy saving. In allowing for the targeted application of UE context retention, much longer context retention may be supported for particular UEs or classes of UEs, enabling the reduced attach procedure of FIG. 11 to be performed before communication events. This streamlined attach procedure improves the efficiency of the detach-reattach method. In addition, this method may become energy efficient even for devices having shorter time periods between communication events. The reduced signalling overhead on reattach moves the breakeven point for detach-reattach in terms of the length of time a device must spend in deepest sleep in order to compensate in terms of energy requirements for the need to perform network reattach before each communication event. While such benefits may be particularly applicable to MTC devices, the present invention is not limited to such devices, being applicable to all forms of User Equipment. Similarly, while the invention has been described with reference to operation in an EPS/LTE network, the invention is equally applicable to other cellular network systems including UMTS, WCDMA and HSPA.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a user equipment device in a wireless communication network, the method comprising:

determining whether the user equipment will apply an energy saving process, the energy saving process comprising periods of extended user equipment inactivity; and upon determining the user equipment will apply an energy saving process, performing a first network attach procedure, wherein the first network attach procedure comprises transmitting, to a network node, an instruction that includes an indication that the user equipment will apply an energy saving process and that the network node should retain context information for the user equipment after the user equipment performs a network detach procedure.

2. The method of claim 1, further comprising:

performing a network detach procedure;

entering an extended period of user equipment inactivity; and performing a second network attach procedure, wherein the first network attach procedure comprises a first number of signaling operations, the second network attach procedure comprises a second number of signaling operations, and the second number of signaling operations is less than the first number of signaling operations.

3. The method of claim 1, further comprising sending configuration data concerning the energy saving process to the network node.

4. The method of claim 3, wherein sending configuration data comprises sending a message during at least one of a network attach session, attach signaling, detach signaling, or user equipment capability or category signaling.

5. The method of claim 3, wherein the configuration data comprises a time period for context retention.

6. The method of claim 1, further comprising retaining a user equipment device identifier for the user equipment device.

7. The method of claim 1, further comprising retaining a bearer identity for each bearer associated with the user equipment device for which context information has been retained in the network node or other network entities.

8. A computer program product comprising instructions stored on non-transient computer-readable media which, when executed by a processor, perform the steps of claim 1.

9. A user equipment device operable in a wireless communication network, the user equipment device comprising a processor operable to:
   determine whether the user equipment will apply an energy saving process, the energy saving process comprising periods of extended user equipment inactivity; and
   upon determining the user equipment will apply an energy saving process, perform a first network attach procedure, wherein the first network attach procedure comprises transmitting, to a network node, an instruction that includes an indication that the user equipment will apply an energy saving process and that the network node should retain context information for the user equipment after the user equipment performs a network detach procedure.

10. The user equipment device of claim 9, the processor further operable to:
   perform a network detach procedure;
   enter an extended period of user equipment inactivity; and
   perform a second network attach procedure, wherein the first network attach procedure comprises a first number of signaling operations, the second network attach procedure comprises a second number of signaling operations, and the second number of signaling operations is less than the first number of signaling operations.

11. The user equipment device of claim 9, the processor further operable to send configuration data concerning the energy saving process to the network node.

12. The user equipment device of claim 11, wherein the processor is operable to send configuration data by sending a message during at least one of a network attach session, attach signaling, detach signaling, or user equipment capability or category signaling.

13. The user equipment device of claim 11, wherein the configuration data comprises a time period for context retention.

14. The user equipment device of claim 9, the processor further operable to retain a user equipment device identifier for the user equipment device.

15. The user equipment device of claim 9, the processor further operable to retain a bearer identity for each bearer associated with the user equipment device for which context information has been retained in the network node or other network entities.

* * * * *